United States Patent [19]

Kimura

[11] 4,313,136

[45] Jan. 26, 1982

[54] SYNCHRONIZING SIGNAL SEPARATION SYSTEM

[75] Inventor: Kenji Kimura, Tachikawa, Japan

[73] Assignee: Olympus Optical Co., Ltd., Tokyo, Japan

[21] Appl. No.: 119,116

[22] Filed: Feb. 6, 1980

[30] Foreign Application Priority Data

Feb. 13, 1979 [JP] Japan .................................. 54-15332

[51] Int. Cl.³ .............................................. H04N 5/08
[52] U.S. Cl. ...................................... 358/153; 360/37
[58] Field of Search ...................... 358/153, 154, 128.6; 360/36, 37

[56] References Cited

U.S. PATENT DOCUMENTS 3,564,141  2/1971  Hurst ........................................ 360/37
3,573,359  4/1971  Barrett .................................... 360/37
3,814,844  6/1974  Waldspurger et al. ................ 360/37
4,159,481  6/1979  Mikado ................................. 358/153

*Primary Examiner*—Richard Murray
*Attorney, Agent, or Firm*—Toren, McGeady & Stanger

[57] ABSTRACT

A synchronizing signal separation system for use in a recording and reproducing system is disclosed. The system comprises step of oscillating a flywheel oscillator by a synchronizing signal contained in a reproduced transformation signal thereby simultaneously generating a window pulse output and the other pulse output on the basis of the oscillated output, generating the window pulse output and the synchronizing signal as a time-base correction signal to be detected through a logical operation means, and generating the other pulse output as a signal to be detected through the logical operation means in case of lacking the synchronizing signal.

3 Claims, 2 Drawing Figures

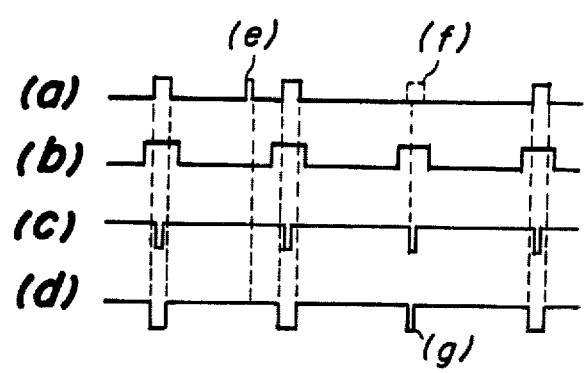

SYNCHRONIZING SIGNAL SEPARATION SYSTEM

BACKGROUND OF THE INVENTION

The present invention relates to a synchronizing signal separation system for use in a recording and reproduction system of a video signal and for separating the synchronizing signal when a transformation signal of a plurality channels subjected to a band limitation and obtained by means of Hadamard transformation or time division is recorded and reproduced by a plurality of fixed heads or the like.

In a recording and reproducing apparatus using a fixed multi-channel head, time-base fluctuations or a time jitter and drift may occur in a reproduced signal as a result of a positional error in a head or unevenness in the running of the tape.

One method of solving this problem involves inserting a time-base correction signal into a horizontal blanking phase portion of a transformation signal at the time of recording, separating this recorded signal from the transformation signal at the time of reproduction, and time-base correcting this separated signal as a signal to be detected for time-base fluctuation in general. In this case, as a time-base correction signal, a horizontal synchronizing signal contained in a video signal can be used as it is. Therefore, the time-base correction signal may be made as a synchronizing signal hereinafter. The reproduced synchronizing signal often causes a dropout in a short time by the scar of a magnetic tape or malconnection of a recording and reproduction head with the magnetic tape or the like, thereby lacking the signal, or generating a transient noise caused by a dropout in the portion other than the phase of the normal synchronizing signal and generating a spurious pulse. It means that time-base correction at that time is erroneously operated by lacking the synchronizing signal or mixing the spurious pulse, so as to make considerable deterioration of a reproduced picture.

SUMMARY OF THE INVENTION

It is an object of the present invention to eliminate the above described disadvantages of conventional synchronizing separator.

It is another object of the present invention to provide a synchronizing signal separation system for obtaining a constantly stable synchronizing signal by generating a pulse approximately corresponding to the synchronizing signal in case of lacking the synchronizing signal and by removing a spurious pulse in case of mixing the spurious pulse therein.

According to the present invention a synchronizing signal separation system comprises steps of oscillating a flywheel oscillator by a synchronizing signal contained in a reproduced transformation signal thereby simultaneously generating a window pulse output and the other pulse output on the basis of the oscillated output, generating the window pulse output and the synchronizing signal as a time-base correction signal to be detected through a logical operation means, and generating the other pulse output as a signal to be detected through the logical operation means in case of lacking the synchronizing signal.

BRIEF DESCRIPTION OF THE DRAWINGS

FIG. 2 is a diagram showing a time chart for explaining the synchronizing signal separation system shown in FIG. 1.

DESCRIPTION OF THE PREFERRED EMBODIMENT

Figure 1:
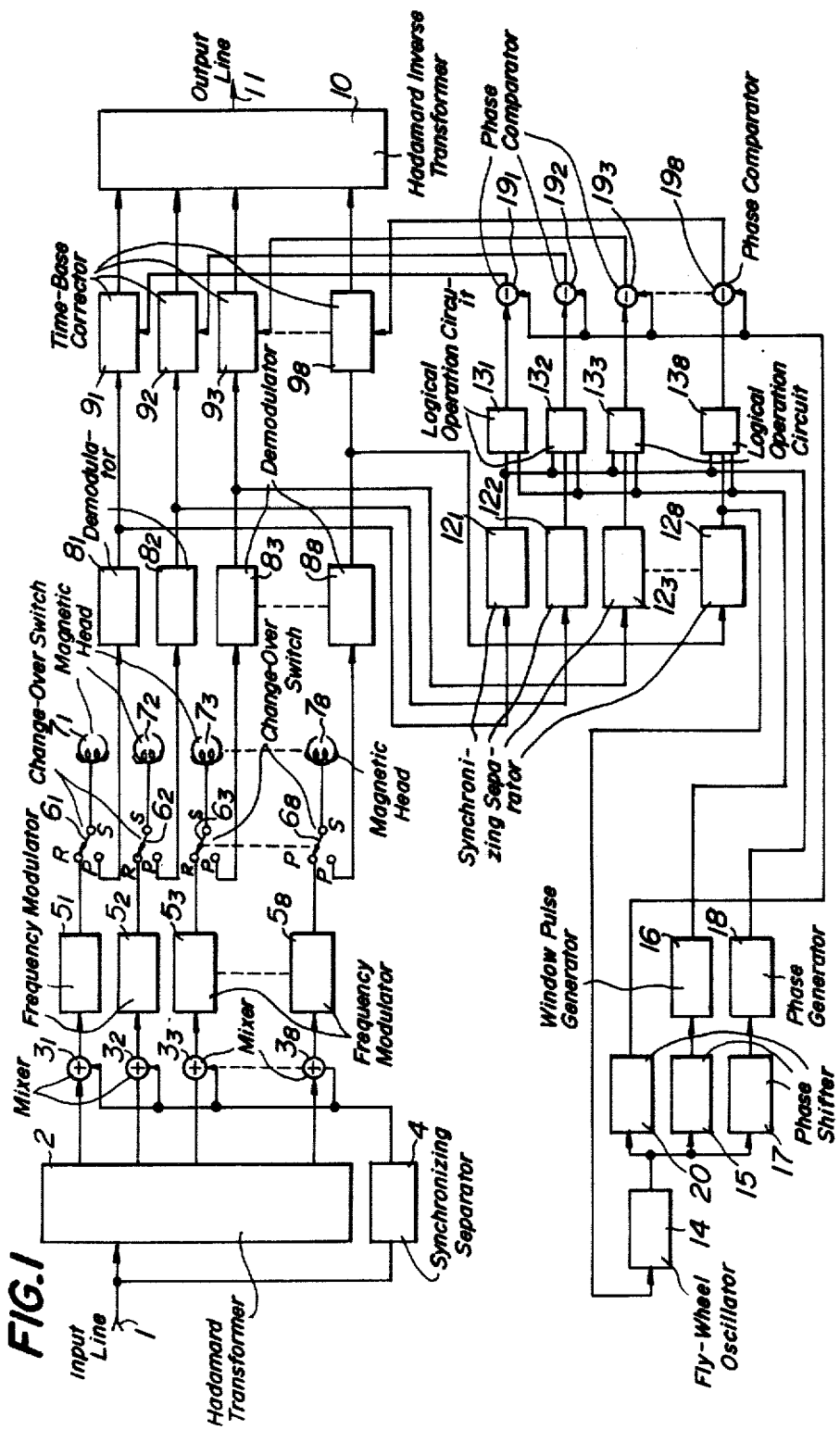
FIG. 1 is a block diagram showing a circuit arrangement of a synchronizing signal separation system according to the present invention.

Referring now to the drawing one embodiment of a synchronizing signal separation system according to the present invention will be explained.

In FIG. 1, an input line 1 receives an input video signal. The line 1 is connected to a transformer, for example an Hadamard transformer 2 which comprises a resistor matrix and the like and generates a multichannel Hadamard transformation signal (8 channels in the embodiment).

An output terminal of the transformer 2 is connected to one input terminal of mixers $3_1, 3_2 \ldots 3_8$. The other input terminal of these mixers $3_1, 3_2 \ldots 3_8$ are connected to a synchronizing separator 4.

The synchronizing separator 4 is connected to the input line 1 at the input terminal thereof, so as to separate a horizontal synchronzing signal contained in an input video signal and generate it as a time-base correction signal (hereinafter referred to as a synchronizing signal).

With the above construction, each mixer $3_1, 3_2 \ldots 3_8$ generates a synchronizing signal mixed with a transformation signal.

The output terminals of the mixers $3_1, 3_2 \ldots 3_8$ are connected to frequency modulators $5_1, 5_2, \ldots 5_8$, respectively. These frequency modulators $5_1, 5_2 \ldots 5_8$ FM-modulate the outputs of the mixers $3_1, 3_2 \ldots 3_8$ and generate an FM carrier.

The output terminals of these frequency modulators $5_1, 5_2 \ldots 5_8$ are connected to recording and reproducing magnetic heads $7_1, 7_2 \ldots 7_8$, through recording contacts R-S of change-over switches $6_1, 6_2 \ldots 6_8$, respectively.

These magnetic heads $7_1, 7_2 \ldots 7_8$ are connected to demodulators $8_1, 8_2 \ldots 8_8$ through reproducing contacts P-S of the change-over switches $6_1, 6_2 \ldots 6_8$, and the output terminals of the demodulators $8_1, 8_2 \ldots 8_8$ are connected to time-base correctors $9_1, 9_2 \ldots 9_8$ respectively. The time-base correctors $9_1, 9_2 \ldots 9_8$ absorb and remove a jitter-drift component contained in a reproduced and transformed signal.

The output terminals of the time-base correctors $9_1, 9_2 \ldots 9_8$ are connected to an inverse transformer, for example an Hadamard inverse transformer 10. The inverse transformer 10 comprises a resistor matrix or the like for reproducing the original video signal from the output of the time-base correctors $9_1, 9_2 \ldots 9_8$ thereby to generate the reproduced signal on an output line 11.

The output terminal of the demodulators $8_1, 8_2 \ldots 8_8$ are connected to synchronizing separators $12_1, 12_2 \ldots 12_8$, respectively. The synchronizing separators $12_1, 12_2 \ldots 12_8$ separate a synchronizing signal contained in the reproduced and transformed signal.

The output terminals of the synchronizing separators $12_1, 12_2 \ldots 12_8$ are connected to first input terminals of logical operation circuits $13_1, 13_2 \ldots 13_8$.

In this case, the logical operation circuits $13_1, 13_2 \ldots 13_8$ have first, second and third input terminals, so as to generate a NAND output by an input signal supplied to the first and second input terminals for example and preferentially generate by the input signal supplied to the third input terminal outputs having polarity of this input signal.

Moreover, either output terminal (output terminal of the synchronizing separator $12_8$ in the illustrated embodiment) of the synchronizing separators $12_1, 12_2 \ldots 12_8$ is connected to a flywheel oscillator 14. The flywheel oscillator 14 generates an output signal as a reference signal for time-base correction, so that even if a synchronizing separator $12_8$ is lacked for a short time by a flywheel effect or a spurious pulse is mixed therein, the flywheel oscillator is not influenced but generates the output in which a jitter-drift component thereof is fully absorbed.

The output terminal of the flywheel oscillator 14 is connected to a window pulse generator 16 through a phase shifter 15. The pulse generator 16 generates a window pulse having a predetermined duration by the output of the flywheel oscillator 14. In this case, the phase of the window pulse coincides with the center of a synchronizing signal by adjusting a shifted phase amount of the phase shifter 15.

The output terminal of the flywheel oscillator 14 is connected to a pulse generator 18 through a phase shifter 17. The pulse generator 18 is triggered by the output of the flywheel oscillator 14 to generate a pulse output having negative polarity. In this case, the pulse phase also coincides with the center of the synchronizing signal by adjusting the shifted phase amount of the phase shifter 17.

The output terminal of the window pulse generator 16 is connected to the second input terminal of the logical operation circuits $13_1, 13_2 \ldots 13_8$, and the output terminal of the pulse generator 16 is connected to the input terminal of the logical operation circuits $13_1, 13_2 \ldots 13_8$.

The output terminal of the logical operation circuits $13_1, 13_2 \ldots 13_8$ is connected to one input terminal of phase comparators $19_1, 19_2 \ldots 19_8$. The other input terminal of the phase comparators $19_1, 19_2 \ldots 19_8$ are connected to the flywheel oscillator 14 through a phase shifter 20 at the other input end, and the output terminal of the phase comparations are connected to the time-base correctors $9_1, 9_2 \ldots 9_n$.

The operation of the synchronizing signal separation system will be explained as follows. In the first place, let the recording contacts R-S of the change-over switches $6_1, 6_2 \ldots 6_8$ be closed under the recording state.

In this state, if a video signal is applied to the input line 1, Hadamard transformation signals of 8 channels are generated from the Hadamard transformer 2 and supplied to the mixers $3_1, 3_2 \ldots 3_8$.

On the other hand, the horizontal synchronizing signal contained in the input video signal is separated by the synchronizing separator 4 and supplied to the mixers $3_1, 3_2 \ldots 3_8$ as a synchronizing signal.

The synchronizing signal is then mixed into the transformation signal by the mixers $3_1, 3_2 \ldots 3_8$, FM-modulated by the frequency modulators $5_1, 5_2 \ldots 5_8$, supplied to the magnetic heads $7_1, 7_2 \ldots 7_8$ through the recording contacts R-S of the change-over switches $6_1, 6_2 \ldots 6_8$ as an output of an FM carrier, and recorded on a magnetic tape (not shown).

Thereafter, the reproducing contacts P-S of the change-over switches $6_1, 6_2 \ldots 6_8$ are closed to set the system to be reproduction mode. Then, the reproduced transformation signals derived from the magnetic heads $7_1, 7_2 \ldots 7_8$ are supplied to the demodulators $8_1, 8_2 \ldots 8_8$ through the reproducing contacts P-S of the change-over switches $6_1, 6_2 \ldots 6_8$ and supplied to the time-base correctors $9_1, 9_2 \ldots 9_8$ after demodulation. Moreover, the outputs of the demodulators $8_1, 8_2 \ldots 8_n$ are supplied to the synchronizing separators $12_1, 12_2 \ldots 12_8$. Then, only the synchronizing signal in the reproduced transformation signal is generated by these separators $12_1, 12_2 \ldots 12_8$.

On the other hand, because the output of the synchronizing separator $12_8$ is supplied to the flywheel oscillator 14, a window pulse is generated in the window pulse generator by the output of the flywheel oscillator 14, while a pulse output of negative polarity is generated in the pulse generator 18.

This condition is explained with reference to FIG. 2. If the synchronizing signal is supplied as shown in FIG. 2a, the window pulse is generated so its phase coincides with the center of the synchronizing signal as shown in FIG. 2b, while the pulse output of negative polarity is also generated to coincide its phase with the center of the synchronizing signal as shown in FIG. 2c. The output shown in FIG. 2d, therefore, is generated by the logical operation circuits $13_1, 13_2 \ldots 13_8$, and supplied to the time-base correctors $9_1, 9_2 \ldots 9_8$ through the phase comparators $19_1, 19_2 \ldots 19_8$ as a signal detected for time-base correction. Accordingly, the jitter-drift component contained in the reproduced transformation signal is absorbed by the time-base correctors $9_1, 9_2 \ldots 9_8$, supplied to the Hadamard inverse transformer 10, reproduced as the original video signal and transmitted to the output line 11 as a reproduced video signal.

If the synchronizing signal is normally generated, the above operation is repeated.

If a spurious pulse shown as (e) in FIG. 2(a) appears for some reason, the flywheel oscillator 14 due to its flywheel effect is not influenced by such a noise pulse and no output is generated. Therefore, none of the window pulse generator 16 and the pulse generator 18 generates the output. Thus, no output is generated from the logical operation circuits $13_1, 13_2 \ldots 13_8$, so as to prevent any erronrous output of the signal to be detected from supplying to the time-base correctors $9_1, 9_2 \ldots 9_8$.

Moreover, as shown in FIG. 2f, if the normal synchronizing signal is lacking, the flywheel oscillator 14 generates the output signal by virtue of the flywheel effect regardless of a lack of the synchronizing signal. By this output signal a window pulse is generated from the window pulse generator 16 and a pulse output of negative polarity is also generated by the pulse generator 18.

In this case, synchronizing signal has been lacking, so that the pulse (g) corresponding to the synchronizing signal shown in FIG. 2d is generated in the logical operation circuits $13_1, 13_2 \ldots 13_8$ by virtue of the above pulse output of negative polarity and supplied to the time-base correctors $9_1, 9_2 \ldots 9_8$ through the phase comparators $19_1, 19_2 \ldots 19_8$ as a time correction signal to be detected. As a result, the operation for normal time-base correction can be obtained regardless of a lack of the synchronizing signal.

In the above manner, even if a spurious pulse is mixed into the synchronizing signal, such spurious pulse can be removed, and if the synchronizing signal is lacked, a pulse approximately corresponding to the synchronizing signal can be generated, so that the synchronizing signal is constantly stably obtained.

The present invention is not limited to the above embodiment but can be modified without departing from the scope of the invention. For example, the above embodiment describes the case of 8 channels, but the present invention can be applied to any number of channels. In addition, the above embodiment uses an Hadamard transformation system, but the present invention can also utilize a time division system.

As described above, according to the present invention, in case of lacking a synchronizing signal, a pulse approximately corresponding to the synchronizing signal is generated and in case of mixing a spurious pulse, such pulse can be removed, so that the present invention can provide a synchronizing signal separation system for obtaining a constantly stable synchronizing signal.

What is claimed is:

1. A synchronizing signal separation system for use with a tape playback system responsive to transformation signals, comprising a flywheel oscillator responsive to a synchronizing signal contained in a reproduced transformation signal, means responsive to the oscillator for simultaneously generating a window pulse output and a timing pulse output, logic means for utilizing the window pulse output and the synchronizing signal as a time-base correction signal and for utilizing the timing pulse output as a signal to be detected when a synchronizing signal is lacking.

2. A video recording and playback system comprising transformation means for transforming a video signal into a plurality of channel signals, a synchronizing separator for separating the synchronizing of a portion of the video signal and applying the synchronizing portion to each of the channels as synchronizing signals, a plurality of frequency modulators for frequency modulating the combined synchronizing signals and channel signals in the respective channels, a plurality of magnetic head means each for recording the video signals in a channel, a plurality of demodulators each responsive to one of said magnetic head means, inverse transformation means responsive to said demodulators for producing an output video signal, a plurality of synchronizing separator means each connected to one of said demodulators, a flywheel oscillator responsive to one of said synchronizing separator means for producing window pulses and timing signals, logic means responsive to said window pulses and said timing signals as well as to said synchronizing separator means for producing a plurality of output pulses, one for each channel, representative of corrected time base synchronizing signals, and a plurality of time base correctors between said demodulators and said inverse transformation means for correcting the time base of inputs to said inverse transformation means.

3. A video playback system responsive to a plurality of channels of video signals formed by a transformer, comprising magnetic head means for detecting signals in each of the channels, a plurality of demodulators each responsive to one of said magnetic head means, inverse transformation means responsive to said demodulators for producing an output video signal, a plurality of synchronizing separator means each connected to one of said demodulators, a flywheel oscillator responsive to one of said synchronizing separator means for producing window pulses and timing signals, logic means responsive to said window pulses and said timing signals as well as to said synchronizing separator means for producing a plurality of output pulses, one for each channel, representative of corrected time base synchronizing signals, and a plurality of time base correctors between said demodulators and said inverse transformation means for correcting the time base of inputs to said inverse transformation means.

* * * * *